United States Patent [19]

Lang

[11] Patent Number: 5,700,054
[45] Date of Patent: Dec. 23, 1997

[54] VEHICLE SEAT ASSEMBLY INCLUDING INTEGRAL CHILD RESTRAINT SEAT

[75] Inventor: Ulf Otto Lang, Trollhattan, Sweden

[73] Assignee: Lear Corporation, Southfield, Mich.

[21] Appl. No.: 781,825

[22] Filed: Jan. 10, 1997

Related U.S. Application Data

[60] Provisional application No. 60/016,002 Apr. 26, 1996.

[51] Int. Cl.⁶ .................................................. A47C 15/00
[52] U.S. Cl. ........................... 297/238; 297/14; 297/112
[58] Field of Search .......................... 297/238, 14, 112, 297/216.11, 408

[56] References Cited

U.S. PATENT DOCUMENTS

| | | |
|---|---|---|
| 3,951,450 | 4/1976 | Gambotti. |
| 4,900,086 | 2/1990 | Steward. |
| 5,106,158 | 4/1992 | Dukatz et al.. |
| 5,282,667 | 2/1994 | Elton et al.. |
| 5,282,668 | 2/1994 | Heussner et al.. |
| 5,312,156 | 5/1994 | Heussner et al.. |
| 5,366,270 | 11/1994 | Heussner et al. ........................ 297/238 |
| 5,385,384 | 1/1995 | Gierman et al.. |
| 5,429,414 | 7/1995 | Olsson et al.. |
| 5,466,043 | 11/1995 | Lambert et al. ........................ 297/238 |
| 5,498,062 | 3/1996 | Holdampf. |

FOREIGN PATENT DOCUMENTS

| | | |
|---|---|---|
| 2807064 | 2/1978 | Germany. |
| 2454573 | 11/1978 | Germany. |
| 2283164 | 5/1995 | United Kingdom. |

*Primary Examiner*—Laurie K. Cranmer
*Attorney, Agent, or Firm*—Howard & Howard

[57] ABSTRACT

A child restraint seat disposed in a cavity of an adult seat back for restraining a child in a seat. The child restraint seat comprises a child seat portion pivotal between a folded position recessed in the cavity and an unfolded use position against the adult seat portion. A child backrest portion is moveable between a stowed position in the cavity and an outwardly extending inclined position. A first hinge automatically pivots the lower end of the child backrest from the stowed position to the inclined position and a second hinge automatically extends the upper end of the child backrest forward of the cavity in response to the pivotal movement of the child seat portion from the folded position to the unfolded use position. A headrest member is coupled to the child seat portion by a pivot member for automatically pivoting the headrest from a closed position to an open position raised above and aligned with the adult and child backrest portions.

20 Claims, 5 Drawing Sheets

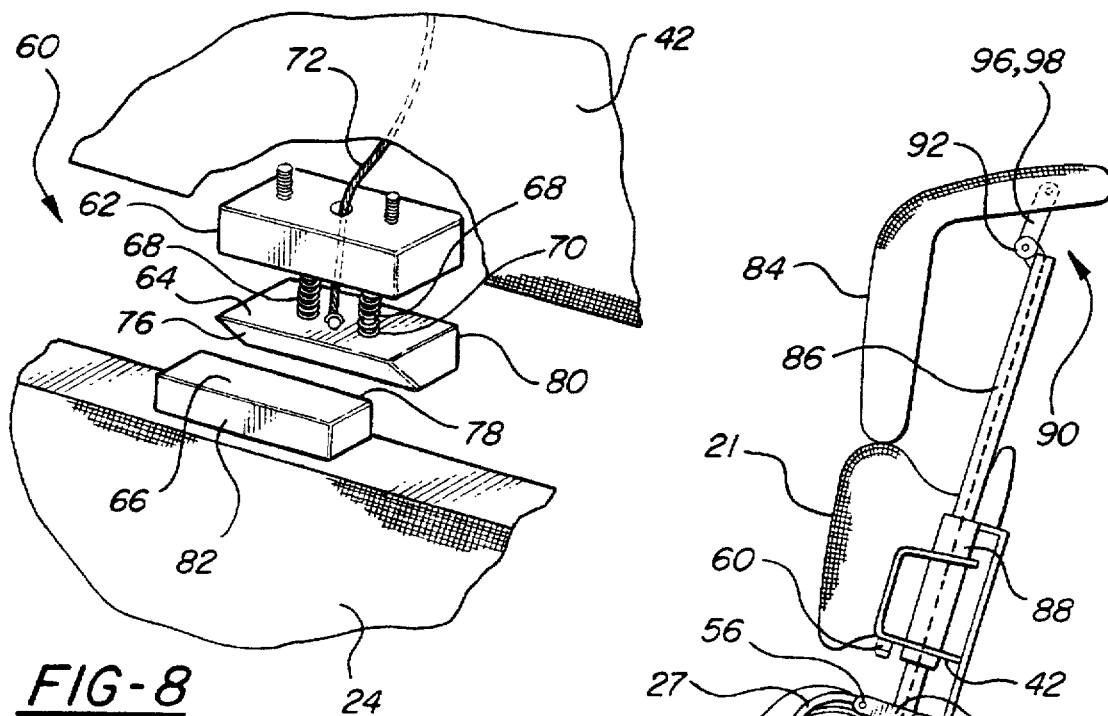
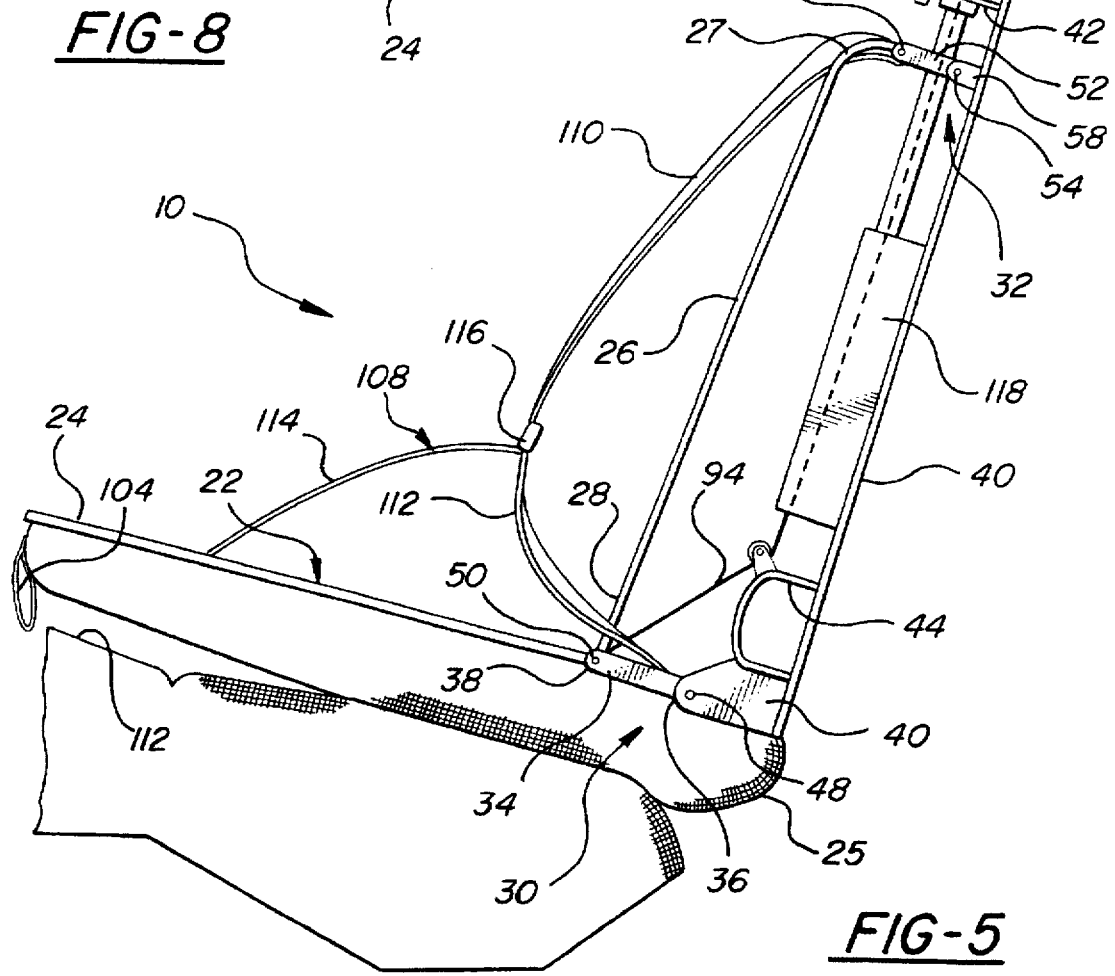

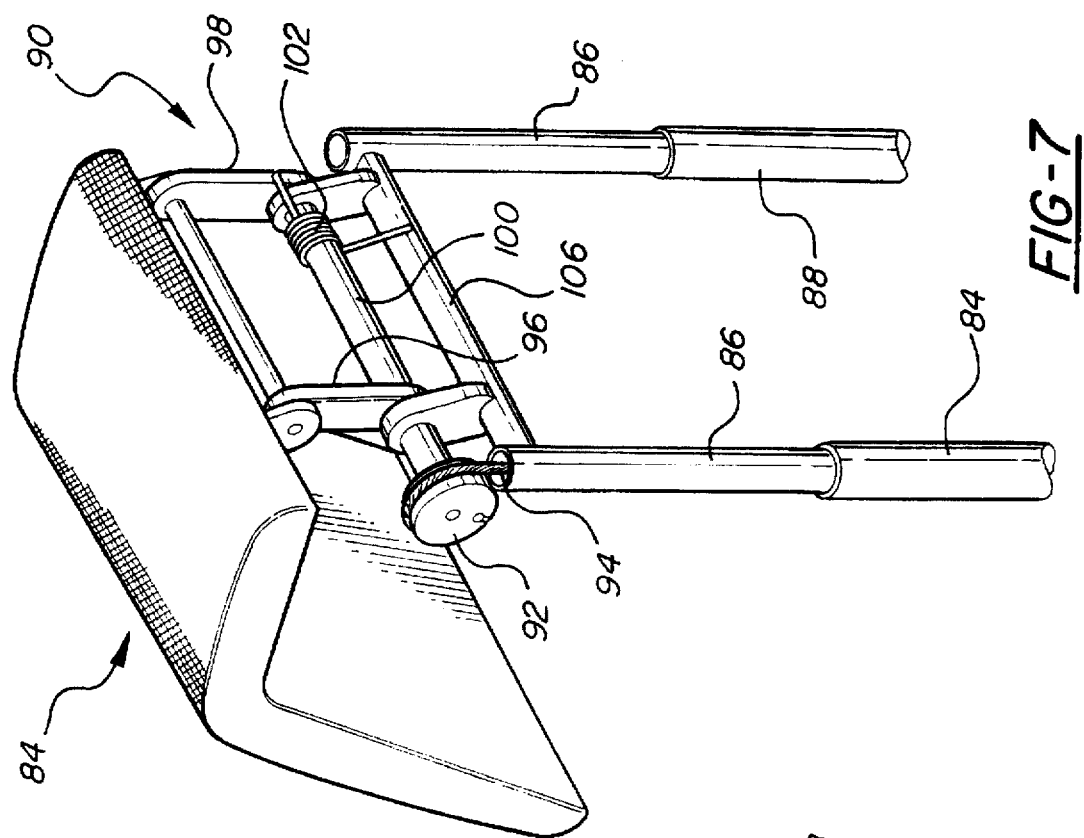
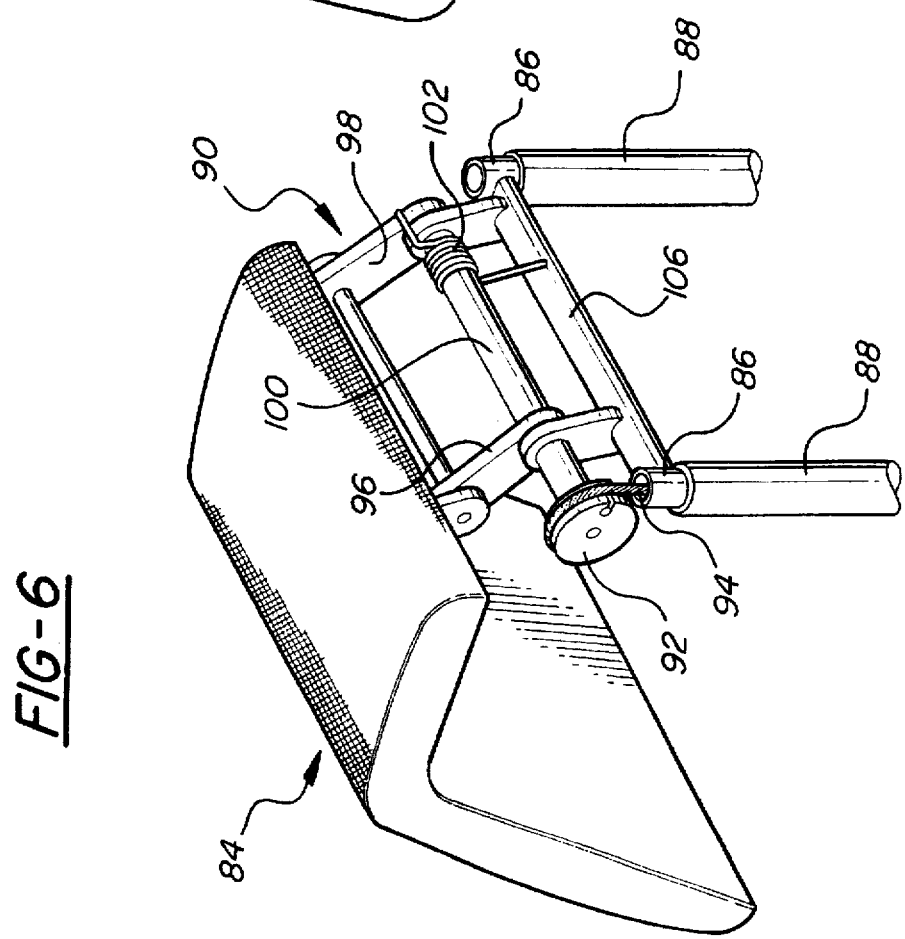

VEHICLE SEAT ASSEMBLY INCLUDING INTEGRAL CHILD RESTRAINT SEAT

RELATED APPLICATION

This application claims priority to and all of the benefits of co-pending U.S. provisional patent application Ser. No. 60/016,002 which was filed on Apr. 23, 1996 and is entitled "Vehicle Seat Assembly Including Integrated Child Restraint Seat".

TECHNICAL FIELD

The subject invention relates generally to a vehicle passenger seat assembly, and more specifically, to a vehicle passenger seat assembly having a child restraint seat disposed in the backrest cushion of the vehicle passenger seat for restraining a child in the vehicle and an automatic headrest responsive to the positioning of the child seat.

BACKGROUND OF THE INVENTION

By way of background, it is becoming increasingly common for automotive vehicles to provide a child restraint seat disposed integrally in the adult passenger seat for restraining a child in the vehicle. It is often desirable to provide a child seat which folds or collapses to a storage position as part of the adult passenger seat such that the adult seat maintains its normal function and yet the child seat is readily accessible.

The U.S. Pat. Nos. 5,282,668 and 5,312,156 to Heussner et al., and assigned to the current assignee, issued Feb. 1, 1994 and May 17, 1994 respectively, disclose a child restraint seat disposed in the backrest portion of an adult passenger seat and pivotal between a stowed position recessed in the adult seat to an unfolded use position for restraining a child in the seat.

The 5,312,156 Patent discloses a pivot member between the child backrest portion and the adult backrest portion for automatically extending the lower end of the child backrest outwardly away from the adult backrest while retracting the upper end of the child backrest into a cavity in the adult backrest upon pivotal movement of the child seat portion from a folded position to an unfolded use position.

The 5,282,668 patent discloses a headrest pivot interconnecting the child seat headrest and the adult backrest for pivoting the headrest in an arcuate orbital path from a folded position forming an upper portion of the adult backrest to an unfolded position aligned in a plane parallel with the child backrest and forming an extended portion thereof.

Further, the U.S. Pat. No. 5,498,062 to Holdampf, issued Mar. 12, 1996 discloses an integral child restraint seat having a child seat portion pivotal between a folded position forming a portion of the adult backrest to an unfolded use position. A headrest member is interconnected to the child seat portion and automatically rotates to a flipped-up raised position in response to the pivotal movement of the child seat portion from the folded position to the unfolded position.

It remains desirable to provide a child restraint seat disposed in an adult passenger seat which automatically adjusts or extends the child backrest portion to a predetermined optimum inclined seating angle in response to pivotal movement of the child seat portion from the folded position recessed in the adult seat to the unfolded use position for restraining a child in the vehicle. Further, it also remains desirable to provide a child headrest member which automatically rotate upwardly and rearwardly upon pivotal movement of the child seat portion to align with the child backrest portion in the unfolded use position.

SUMMARY OF THE INVENTION

A child restraint seat for disposition in the seat back cushion of an adult passenger seat for restraining a child in a vehicle comprises an adult passenger seat having a generally horizontal seat bottom portion and a generally upright seat back portion. A cavity is recessed in the adult seat back portion for receiving the child restraint seat. The child restraint seat includes a child seat portion having a first end pivotally coupled to the adult passenger seat between a folded position recessed in the cavity forming at least a portion of the adult seat back portion and an unfolded use position extending downwardly to a generally horizontal position against the adult seat bottom portion. A child backrest portion having an upper end and a lower end is disposed in the cavity and moveable between a stowed position generally parallel with the adult seat back portion and an inclined position tilted outwardly to a predetermined child backrest angle. A first hinge interconnects the first end of the child seat portion and the lower end of the child backrest portion for automatically pivoting the lower end of the child backrest portion from the stowed position to the inclined position in response to pivotal rotation of the child seat portion from the folded position recessed in the cavity to the unfolded use position against the adult seat portion and a second hinge interconnects the upper end of the child backrest portion and the adult seat back portion for automatically extending the upper end of the child backrest portion from the stowed position stored in the cavity to the inclined position extending outwardly and spaced forward of the cavity in response to the pivotal rotation of the child seat portion from the folded position to the unfolded position.

A headrest member is selectively moveable between a closed position covering at least a portion of the adult seat back portion and an open position raised vertically above the adult seat back portion. A pivot member interconnects the headrest member and the child seat portion for automatically pivoting the headrest member about an arcuate orbital path from the closed position at least partially against and forward of the adult seat back portion to the open position raised vertically and rearwardly to a position aligned in a parallel plane with the adult and child backrest portions in response to the pivotal movement of the child seat portion from the folded position to the unfolded use position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a partially broken side view of the adult passenger seat and child restraint seat in the unfolded use position;

FIG. 6 is a perspective view of the child restraint seat in the folded position and the headrest in the lowest and closed position;

FIG. 7 is a perspective view of the child restraint seat in the unfolded position and the headrest in the upper or raised position and rotated to its open position; and FIG. 8 is a partially broken perspective view of a release latch between the child seat portion and the adult seat back portion.

DETAILED DESCRIPTION OF THE PREFERRED EMBODIMENT

Figure 1:
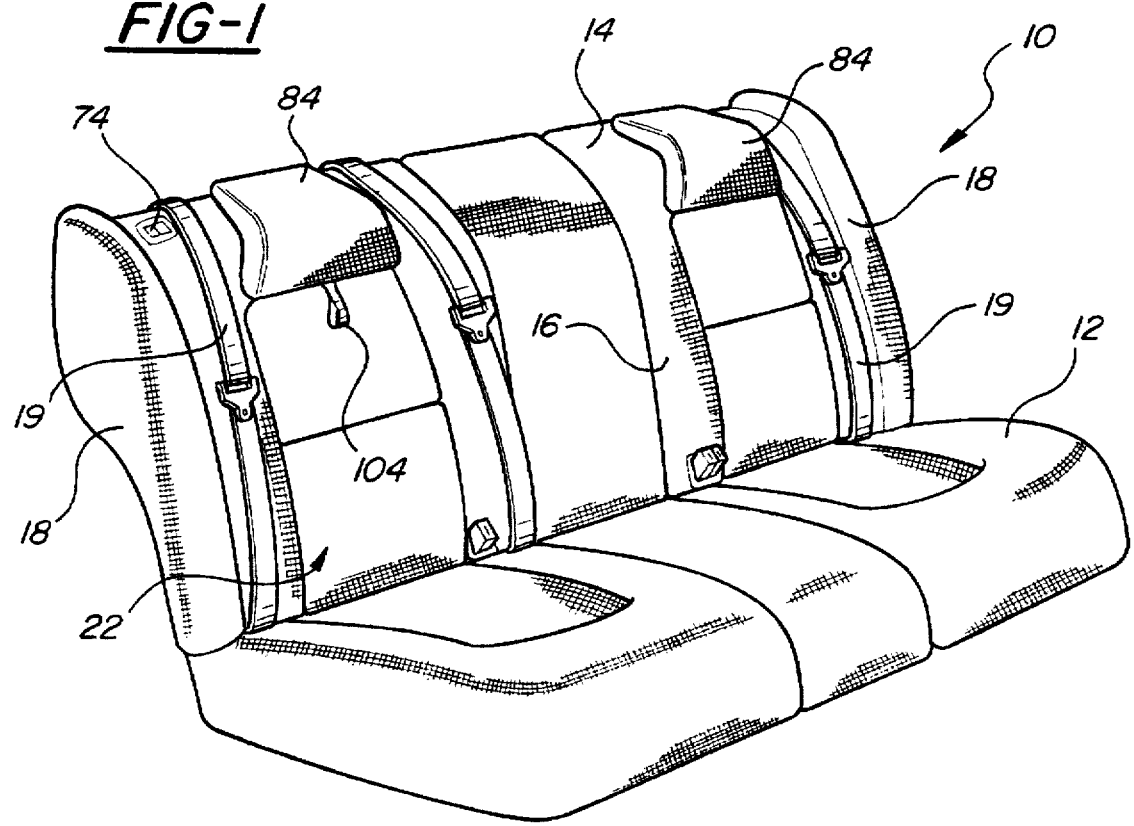
FIG. 1 is a perspective view of an adult passenger seat for use in a vehicle.

Referring to the Figures wherein like numerals indicate like or corresponding parts throughout the several views, FIG. 1 discloses an adult passenger bench-type seat generally indicated at 10 for use in a vehicle. The adult seat 10 includes a generally horizontal seat bottom portion 12 upon which an occupant sits and a generally vertical or upright seat back portion 14. The seat back portion 14 includes a center back support area 16 and side bolsters 18. The adult seat 10 also includes a plurality of seat belts 19 for restraining the occupant in the seat 10.

Each of the seat bottom portion 12 and seat back portion 14 typically include a rigid frame structure of stamped and tubular metal construction. The seat frame is commonly covered by a resilient contoured foam cushion consisting of polyester or the like and encased in a trim cover typically of upholstery cloth fabric, vinyl or leather.

Figure 2:
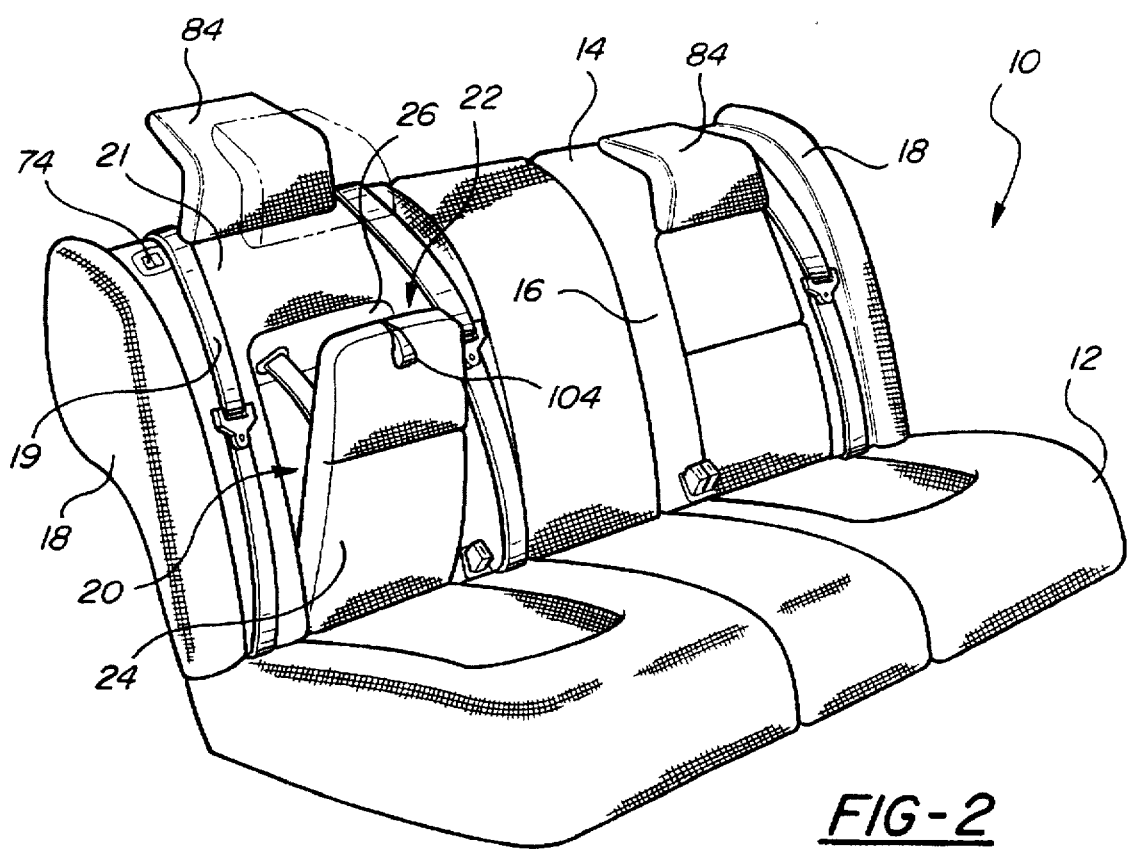
FIG. 2 is a perspective view of the adult passenger seat of FIG. 1 including a child restraint seat moving from a folded position to an unfolded use position and showing in phantom line the movement of the headrest member.

Referring to both FIGS. 1 and 2, the adult seat back further includes a cavity 20 recessed in the face of the adult seat back portion 14 for receiving an integral child restraint seat as generally indicated at 22. The cavity 20 is disposed between the side bolsters 18 and extends from the seat portion 12 to an upper portion 21 of the seat back 14.

Figure 3:
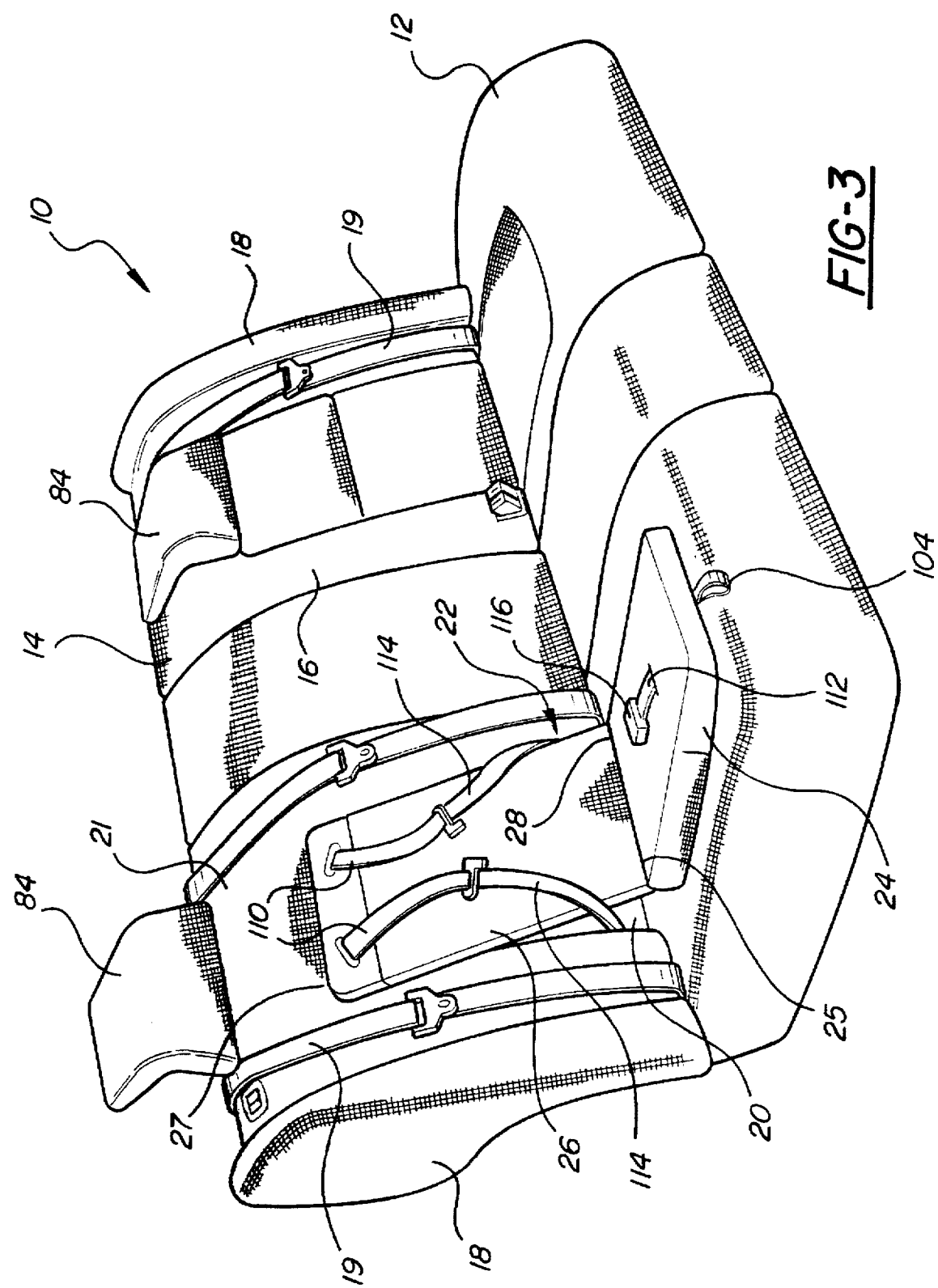
FIG. 3 is a perspective view of the adult passenger seat and child restraint seat in the unfolded use position.

The integral child restraint seat 22 comprises a child seat portion 24 having a first end 25 pivotally secured to the adult passenger seat 10 and pivotal between a folded position recessed in the cavity 20 forming a lower portion of the adult seat back portion 14, as shown in FIG. 1, and an unfolded use position pivoted forwardly and downwardly parallel to and lying against the adult seat bottom portion 12, as shown in FIG. 3. A child backrest portion 26 is disposed in the cavity 20 and includes an upper end 27 and a lower end 28 disposed in the cavity 20 and moveable between a stowed position generally parallel with the adult seat back portion 14 and a lowered and inclined position tilted outwardly to a predetermined child backrest angle.

The child restraint seat 22 further includes a first hinge assembly generally designated at 30 interconnecting the first end 25 of the child seat portion 24 and the lower end 28 of the child backrest portion 26 for automatically pivoting the lower end 28 of the child backrest portion 26 from the stowed position to the inclined position in response to pivotal rotation of the child seat portion 24 from the folded position recessed in the cavity 20 to the unfolded use position against the adult seat portion 12. A second hinge assembly generally designated at 32 interconnects the upper end 27 of the child backrest portion 26 and the adult seat back portion 14 for automatically extending the upper end 27 of the child backrest portion 26 from the stowed position stored in the cavity to the lower inclined position extending outwardly and spaced forward of the cavity 20 in response to the pivotal rotation of the child seat portion 24 from the folded position to the unfolded position.

Figure 4:
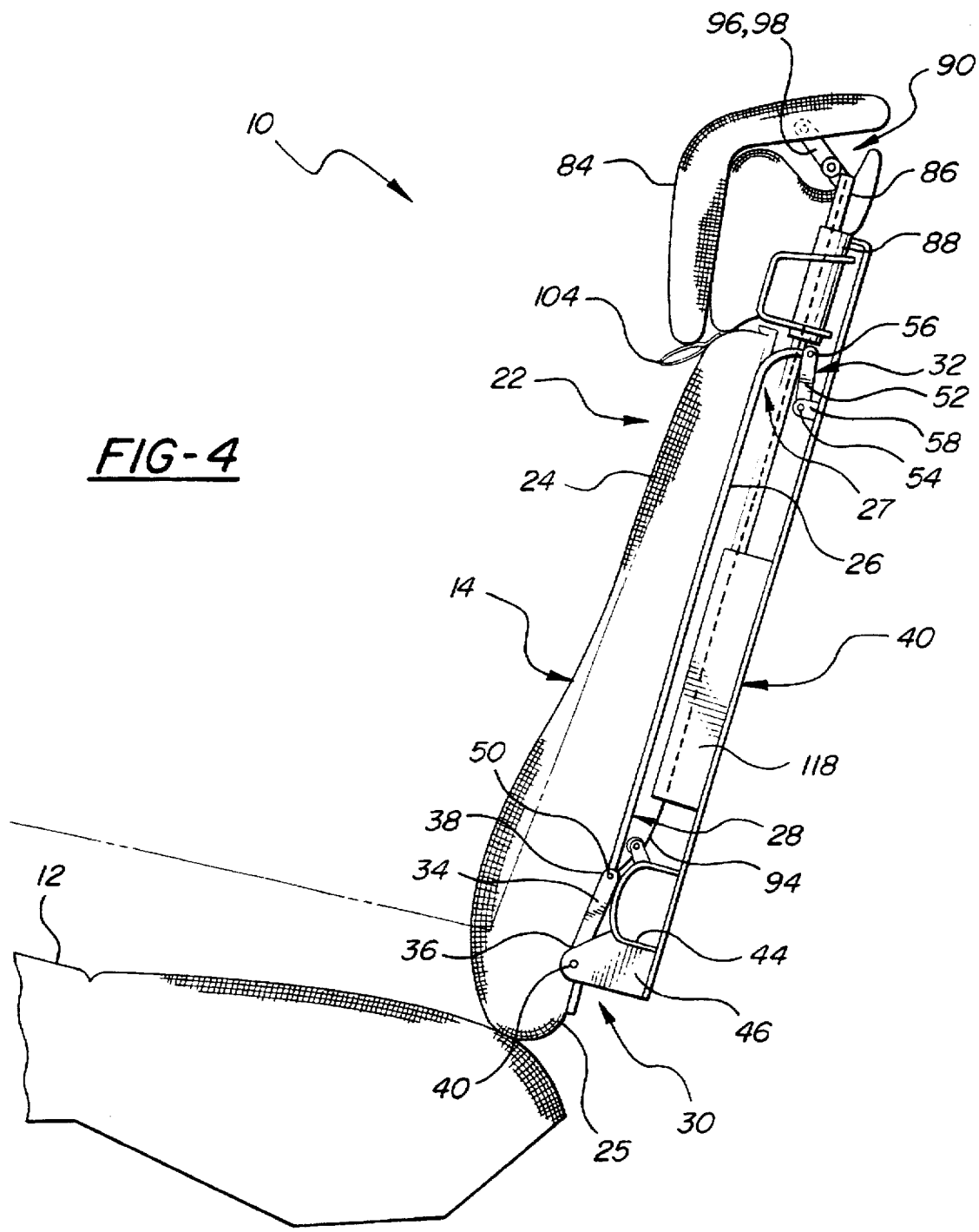
FIG. 4 is a partially broken side view of the adult passenger seat and child restraint seat in the folded position.

Referring to FIGS. 4 and 5, the first hinge assembly 30 includes a seat bottom linkage member 34 having a first end 36 pivotally connecting the first end 25 of the child seat portion 24 and the adult seat back portion 14 and a second end 38 spaced from the first end 36 and fixed to the child seat portion 24 and pivotally connected to the lower end 28 of the child backrest portion 26. The seat bottom linkage 34 is pivotal from a generally upright position with the child seat portion 24 in the folded position to a generally horizontal position extending outwardly from the cavity 20 in the unfolded position and transposed forwardly the distance of linkage member 34.

Further, FIGS. 4 and 5 disclose an adult seat back frame 40 having an upper cross tube support structure 42 and a lower cross tube support structure 44 for supporting the child restraint seat 22. A lower pivot bracket 46 is fixedly secured to the seat back frame 40 below and adjacent to the lower cross tube 44 and extends outwardly therefrom. The first end 25 of the child seat portion 24 is pivotally interconnected at 48 to both the distal end of the lower pivot bracket 46 and the first end 36 of the seat bottom linkage member 34 in order to pivot thereabout. The seat bottom linkage member 34 is further fixed at the second end 38 to the side of the child seat portion 24 and pivotally coupled at 50 to the lower end 28 of the child backrest portion 26. Thus, as the child seat portion 24 is pivoted about the lower pivot bracket 46, the linkage member 34 forces the child seat portion 24 to pivot with respect to the lower end 28 of the child backrest portion 26.

The second hinge assembly 32 includes a seat back linkage member 52 having a first end 54 pivotally connected to the adult seat back portion 14 and a second end 56 pivotally connected to the child backrest portion 26. The seat back linkage member 52 is pivotal from a generally upright position with the child backrest 26 in the stowed position to a generally horizontal position extending the upper end 27 of the child backrest portion 26 outwardly and forward of the cavity 20 in the inclined position. More specifically, the first end 54 of the seat back linkage member 52 is pivotally connected to an upper pivot bracket 58 extending outwardly from the seat back frame 40. The upper pivot bracket 58 is fixedly secured to the sear back frame 40 below and adjacent the upper cross tube 42.

As illustrated in FIG. 5, the seat bottom linkage member 34 has a longer longitudinal length than the seat back linkage member 52 such that the lower end 28 of the child backrest portion 26 is spaced outwardly from the cavity 20 a greater distance than the upper end 27 to the desired predetermined inclined position.

The first and second hinge assemblies 30,32 shown in FIGS. 4 and 5 are also located symmetrically on the opposing sides of the child seat 22 thus, providing first 30 and second 32 hinge assemblies on each side of the child seat 24 and child backrest 26 portions.

In operation, upon the pivotal movement of the child seat portion 24 from the folded position to the unfolded position, the seat bottom linkage member 34 rotates counterclockwise about the lower pivot bracket 46. The second end 38 of the seat bottom linkage 34 pivots about the lower end 28 of the child backrest portion 26 and pulls or extends the lower portion 28 of the child backrest 26 forwardly and downwardly away from the cavity 20 in the adult seat back 14. Since the child backrest 26 is rigid between the upper 27 and lower 28 ends, the extension of the lower end 28 forces the seat back linkage member 52 to pivot downwardly from the upright position in FIG. 4 and outwardly to the extended horizontal position of FIG. 5. Thus, the upper portion is also extended outwardly and spaced forward of the cavity 20 in the seat back 14. Since the seat bottom linkage 34 and lower pivot bracket 46 extend further outwardly from the cavity 20 and seat back frame 40 than the seat back linkage 52 and upper pivot bracket 58, the child backrest 26 is positioned into the child seat inclined position as shown in FIG. 5.

Referring to FIGS. 4, 5 and 8, the child restraint seat 22 includes a child seat release latch 60 secured to the adult seat back portion 14 and engageable with the child seat portion 24 in the folded position to lock the child seat portion 24 and the child backrest portion 26 in the folded and stowed positions respectively. The release latch 60 includes a base member 62 fixedly secured to upper cross tube 42 of the adult seat back frame 40 and a retractable portion 64 biased away from the base member 62 for engaging a tab member 66 on the distal end of the child seat portion 24 in the folded position. As shown in FIG. 8, the release latch 60 further includes a pair of retractable pins 68 interconnecting the base member 62 and the retractable portion 64. The pins 68 retain a pair of coil-type springs 70 for biasing the retractable portion 64 away from the base member 62. A cable 72 interconnects between the retractable portion 64 and a release latch handle 74 on the adult seat back portion 14, as shown in FIG. 1, for retracting the retractable portion 64 against the base member 62 to release the child seat portion 24 from the folded position.

The retractable portion 64 comprises an angled camming surface 76 for engaging the forward edge 78 of the tab member 66 and urging the retractable portion 64 against the base member 62 upon rotation of the child seat portion 24 from the unfolded position to the folded position. The retractable portion 64 further includes a locking surface 80 opposite the camming surface 76 for engaging the rearward edge 82 of tab member 66 to lock the child seat portion 24 in the folded position. Therefore, when the user desires to access the child seat 22, the release handle 74 on the adult seat back 14 may be pulled to retract the retractable portion 64 against the force of the springs 70 and against the base member 62 to remove the locking surface 80 from engagement with the tab member 66 and allow the child seat portion 24 to unfolded to the use position. When the child seat portion 24 is pivoted to the upright folded position, the tab member 66 contacts the camming surface 76 and urges the retractable portion 64 upwardly against the base member 62 until the tab member 66 passes beyond the retractable portion 64. As the springs 70 force the retractable portion 64 away from the base member 62, the locking surface 80 may contact the rearward edge 82 of the tab member 66 to lock the child seat 22 in the folded position.

As shown in FIGS. 4–7, the seat assembly further includes a headrest member 84 selectively moveable between a closed position covering at least a portion of the adult seat back portion 14 and an open position raised vertically above the adult seat back portion 14. As shown in FIGS. 4 and 5, the headrest member 84 may be manually raised and lower in a vertical direction via a pair of sliding headrest posts 86 in guide sleeves 88 for headrest height adjustment by the adult seat occupant.

A pivot assembly, generally designated at 90 interconnects the headrest member 84 and the child seat portion 24 for automatically pivoting the headrest member 84 about an arcuate orbital path from the closed position at least partially against and forward of the adult seat back portion 14, as shown in FIG. 4, to the open position raised vertically and rearwardly to a position aligned in a substantially coextensive or parallel plane with the adult seat back portion 14 and the child backrest portion 26, as shown in FIG. 5, in response to the pivotal movement of the child seat portion 24 from the folded position to the unfolded use position.

The pivot assembly 90 includes a pulley 92 rotatably connected between the headrest member 84 and the child seat portion 24 for pivoting the headrest member 84 from the closed position to the open position. A pull—pull cable 94 interconnects the pulley 92 and the child seat portion 24.

The headrest member 84 includes a pair of headrest guide sleeves 88 secured to the adult seat back portion 14 for slideably receiving a pair of headrest guide posts 86 therein for providing selective vertical movement of the headrest member 84. The headrest guide sleeves 88 are spaced apart and fixedly secured to the upper cross tube 42 on the seat back frame 40 as shown in FIGS. 4 and 5. The headrest member 84 includes a generally rigid L-shaped shell covered by a resilient foam cushion and trim layer.

The pivot member 90 includes a pair of headrest link members 96,98 spaced apart and adjacent opposite sides of the headrest member 84 and having a first end fixedly secured to the respective headrest guide posts 86 and a second end pivotally coupled to the headrest member 84. One of the headrest links 96 connects to the pulley 92 for rotating therewith between the open and closed positions. A connecting rod 100 interconnects the pair of links 96,98 between the headrest guide posts 86 for providing simultaneous rotation of each of the links 96,98 with the pulley 92.

The pivot member 90 further includes a spring 102 coupled between the adult seat back portion 14 and the headrest member 84 for urging the headrest member 84 toward the closed position.

The pull—pull cable 94 has one end wrapped partially around the peripheral edge of the pulley 92 and connected thereto. The cable 94 is guided through one of the headrest guide posts 86 and sleeve 88 and behind the front surface of the child backrest 26. The opposing end of the cable 94 is attached to the first end 25 of the child seat portion 24 at the second end 38 of the seat bottom linkage member 34.

In operation, to facilitate use of the child restraint seat 22, the user first manually raises the headrest member 84 from its lowest position to the upper adult headrest position. The release handle 74 is then pulled to release the child seat portion 24 from the release latch 60 and cavity 20. A pull strap 104 attached to the front edge of the child seat portion 24 may be used to pull open and pivot the child seat portion 24 to the unfolded use position. As previously discussed, the child backrest 26 automatically pivots to the inclined position in response to the pivotal movement of the child seat portion 24 from the folded to unfolded use position. In addition, as the child seat 24 is pivoted downwardly, the headrest cable 94 is pulled downwardly with the child seat 24 and thus forces the pulley 92 to rotate in the clockwise direction. The rotation of the pulley 92 forces the headrest links 96,98 to also rotate clockwise to automatically pivot or rotate the headrest member 84 about an arcuate orbital path from the closed position, as shown in FIG. 6, to the open position, as shown in FIG. 7. In the closed position, the headrest 84 is at least partially forward of and against the adult seat back portion 14 for use as an adult occupant headrest. However, in the open position, the headrest member 84 is raised both vertically and rearwardly by the links 96,98 to a position aligned with the upper portion 21 of the adult seat back 14 and the child backrest 26 to provide an extended child backrest portion and headrest support. Upon return of the child seat portion 24 to the folded position, the cable 94 is release from tension and the spring 102 connected between the connecting rod 100 and a fixed cross bar 106 between the headrest guide posts 86 urges the links 96,98 and thus the headrest member 84 to rotate in the counterclockwise direction and return to the closed position.

Finally, the child restraint seat also includes a seat belt restraint assembly 108 as shown in FIG. 5. The seat belt system 108 includes a pair of shoulder harnesses 110, and leg belt 112 and a waist belt 114, all connected at one end to a seat belt buckle 116. The opposite end of the leg belt 112 is connected to the child seat portion 24 and the opposing ends of the waist belt 114 are connected to the opposing lower pivot brackets 46 on the seat back frame 40. The opposite ends of the shoulder harnesses 110 are retractably coupled to a linear seat belt retractor 118 which is secured to the seat back frame 40 as is commonly known in the child restraint seat art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A child restraint seat for disposition in the seat back cushion of an adult passenger seat for restraining a child in a vehicle comprising:

an adult passenger seat having a generally horizontal seat bottom portion and a generally upright seat back portion;

a cavity recessed in said adult seat back portion for receiving said child restraint seat;

a child seat portion having a first end pivotally coupled to said adult passenger seat between a folded position recessed in said cavity forming at least a portion of said adult seat back portion and an unfolded use position extending downwardly to a generally horizontal position against said adult seat bottom portion;

a child backrest portion having an upper end and a lower end disposed in said cavity and moveable between a stowed position generally parallel with said adult seat back portion and an inclined position tilted outwardly to a predetermined child backrest angle;

a first hinge interconnecting said first end of said child seat portion and said lower end of said child backrest portion for automatically pivoting said lower end of said child backrest portion from said stowed position to said inclined position in response to pivotal rotation of said child seat portion from said folded position recessed in said cavity to said unfolded use position against said adult seat portion; and a second hinge interconnecting said upper end of said child backrest portion and said adult seat back portion for automatically extending said upper end of said child backrest portion from said stowed position stored in said cavity to said inclined position extending outwardly and spaced forward of said cavity in response to said pivotal rotation of said child seat portion from said folded position to said unfolded position.

2. A child restraint seat as set forth in claim 1 wherein said second hinge includes a seat back linkage member having a first end pivotally connected to said adult seat back portion and a second end pivotally connected to said child backrest, said linkage member being pivotal from a generally upright position with said child backrest in said stowed position to a generally horizontal position extending said upper end of said child backrest outwardly from said cavity in said inclined position.

3. A child restraint seat as set forth in claim 2 wherein said first hinge includes a seat bottom linkage member having a first end pivotally connecting said first end of said child seat portion and said adult seat back portion and a second end spaced from said first end and fixed to said child seat portion and pivotally connected to said lower end of said child backrest portion, said seat bottom linkage member being pivotal from a generally upright position with said child seat portion in said folded position to a generally horizontal position extending outwardly from said cavity in said unfolded position.

4. A child restraint seat as set forth in claim 3 wherein said seat bottom linkage member has a longer longitudinal length than said seat back linkage member such that said lower end of said child backrest portion is spaced outwardly from said cavity a greater distance than said upper end in said inclined position.

5. A child restraint seat as set forth in claim 4 further including a child seat release latch secured to said adult seat back and engageable with said child seat portion in said folded position to lock said child seat portion and said child backrest portion in said folded and stowed positions respectively.

6. A child restraint seat as set forth in claim 5 wherein said release latch includes a base member fixedly secured to said adult seat back and a retractable portion biased away from said base member for engaging a tab member on said child seat portion in said folded position.

7. A child restraint seat as set forth in claim 6 wherein said release latch includes a pair of retractable pins interconnecting said base member and said retractable portion, said pins retaining a pair of springs for biasing said retractable portion away from said base member.

8. A child restraint seat as set forth in claim 7 wherein said release latch includes a cable connected between said retractable portion and a release latch handle for retracting said retractable portion against said base member to release said child seat portion from said folded position.

9. A child restraint seat as set forth in claim 8 wherein said retractable portion has an angled camming surface for engaging said tab member and urging said retractable portion against said base member upon rotation of said child seat portion from said unfolded position to said folded position.

10. A child restraint seat as set forth in claim 9 wherein said retractable portion includes a locking surface opposite said camming surface for engaging said tab member to lock said child seat portion in said folded position.

11. A child restraint seat as set forth in claim 3 further including a headrest member selectively moveable between a closed position covering at least a portion of said adult seat back portion and an open position raised vertically above said adult seat back potion and a pivot member interconnecting said headrest member and said child seat portion for automatically pivoting said headrest member about an arcuate orbital path from said closed position at least partially against and forward of said adult seat back portion to said open position raised vertically and rearwardly to a position aligned in a parallel plane with said adult and child backrest portions in response to said pivotal movement of said child seat portion from said folded position to said unfolded use position, said pivot member including a pulley rotatably connected between said headrest member and said child seat portion for pivoting said headrest member from said closed position to said opened position and further including a pull—pull cable interconnecting said pulley and said child seat portion at the first end of said bottom linkage member.

12. A child restraint seat as set forth in claim 11 wherein said headrest member includes a pair of headrest guide sleeves secured to said adult seat back portion for slideably receiving a pair of headrest guide posts therein for providing selective vertical movement of the headrest member, said pivot member including a pair of headrest link members having a first end fixedly secured to said respective headrest guide post and a second end pivotally coupled to said headrest member, one of said headrest links being connected to said pulley for rotating therewith between said open and closed positions.

13. A child restraint seat as set forth in claim 12 wherein said headrest member includes a connecting rod interconnecting said pair of links and providing simultaneous rotation of each of said links with said pulley and said pivot member includes a spring coupled between said adult seat back and said headrest member for urging said headrest member toward said closed position.

14. A child restraint seat for disposition in the seat back cushion of an adult passenger seat for restraining a child in a vehicle comprising:

an adult passenger seat having a generally horizontal seat bottom portion and a generally upright seat back portion;

a cavity recessed in said adult seat back portion for receiving said child restraint seat;

a child seat portion having a first end pivotally coupled to said adult passenger seat between a folded position recessed in said cavity forming at least a portion of said adult seat back portion and an unfolded use position extending downwardly to a generally horizontal position against said adult seat bottom portion;

a child backrest portion disposed in said cavity of said adult seat back portion;

a headrest member selectively moveable between a closed position covering at least a portion of said adult seat back portion and an open position raised vertically above said adult seat back portion; and a pivot member interconnecting said headrest member and said child seat portion for automatically pivoting said headrest member about an arcuate orbital path from said closed position at least partially against and forward of said adult seat back portion to said open position raised vertically and rearwardly to a position aligned in a parallel plane with said adult and child backrest portions in response to said pivotal movement of said child seat portion from said folded position to said unfolded use position.

15. A child restraint seat as set forth in claim 14 wherein said pivot member includes a pulley rotatably connected between said headrest member and said child seat portion for pivoting said headrest member from said closed position to said opened position.

16. A child restraint seat as set forth in claim 15 wherein said pivot member includes a pull—pull cable interconnecting said pulley and said child seat portion.

17. A child restraint seat as set forth in claim 16 wherein said headrest member includes a pair of headrest guide sleeves secured to said adult seat back portion for slideably receiving a pair of headrest guide posts there indoor providing selective vertical movement of the headrest member.

18. A child restraint seat as set forth in claim 17 wherein said pivot member includes a pair of headrest link members having a first end fixedly secured to said respective headrest guide post and a second end pivotally coupled to said headrest member.

19. A child restraint seat as set forth in claim 18 wherein one of said headrest links is connected to said pulley for rotating therewith between said open and closed positions.

20. A child restraint seat as set forth in claim 19 wherein said headrest member includes a connecting rod interconnecting said pair of links and providing simultaneous rotation of each of said links with said pulley and said pivot member includes a spring coupled between said adult seat back and said headrest member for urging said headrest member toward said closed position.

* * * * *